United States Patent
Mizukami et al.

(10) Patent No.: US 11,796,973 B2
(45) Date of Patent: Oct. 24, 2023

(54) CONTROL DEVICE AND DETERMINATION DEVICE

(71) Applicant: FANUC CORPORATION, Yamanashi (JP)

(72) Inventors: Shinichi Mizukami, Yamanashi (JP); Kenichi Okuaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 331 days.

(21) Appl. No.: 16/916,564

(22) Filed: Jun. 30, 2020

(65) Prior Publication Data
US 2021/0011441 A1 Jan. 14, 2021

(30) Foreign Application Priority Data
Jul. 8, 2019 (JP) ................. 2019-126699

(51) Int. Cl.
*G05B 17/02* (2006.01)
*G05B 19/4063* (2006.01)
*G05B 19/406* (2006.01)

(52) U.S. Cl.
CPC ........... *G05B 17/02* (2013.01); *G05B 19/406* (2013.01); *G05B 19/4063* (2013.01); *G05B 2219/2243* (2013.01); *G05B 2219/37375* (2013.01)

(58) Field of Classification Search
CPC .. G05B 17/02; G05B 19/406; G05B 19/4063; G05B 2219/2243; G05B 2219/37375; G05B 2219/34459; G05B 19/19; G05B 2219/35349
See application file for complete search history.

(56) References Cited

U.S. PATENT DOCUMENTS

| | | | |
|---|---|---|---|
| 9,513,043 B2* | 12/2016 | Keres | F25B 49/005 |
| 9,724,979 B1* | 8/2017 | Thumati | G05B 23/0254 |
| 10,208,993 B2* | 2/2019 | Keres | F25B 49/005 |
| 2015/0185716 A1* | 7/2015 | Wichmann | F02C 9/28 |
| | | | 700/287 |

(Continued)

FOREIGN PATENT DOCUMENTS

| JP | 2000-297968 A | 10/2000 |
|---|---|---|
| JP | 2012-053830 A | 3/2012 |
| JP | 2016-031616 A | 3/2016 |

*Primary Examiner* — Ziaul Karim
(74) *Attorney, Agent, or Firm* — Studebaker & Brackett PC

(57) ABSTRACT

In a determination device including at least one sub-device and a control device that controls the sub-device, and determining suitability of the sub-device, the control device includes a selection unit that selects a type of an actual operation characteristic to be obtained from the sub-device, a model information obtaining unit that obtains, as model information, an operation characteristic estimated to be output from the sub-device that is suitable, the operation characteristic corresponding to the selected type, an operation information obtaining unit that obtains actual operation information representing operation information regarding the actual operation characteristic of the sub-device, a determination unit that determines the suitability of the sub-device in accordance with a difference between the obtained actual operation information and the obtained model information, and a determination result output unit that outputs a determination result of the determination unit.

4 Claims, 6 Drawing Sheets

(56) References Cited

U.S. PATENT DOCUMENTS

| | | | | |
|---|---|---|---|---|
| 2016/0098025 A1* | 4/2016 | Mansouri | ............... | G05B 17/02 |
| | | | | 700/29 |
| 2016/0146118 A1* | 5/2016 | Wichmann | ............ | F01D 21/003 |
| | | | | 701/100 |
| 2016/0147204 A1* | 5/2016 | Wichmann | ................ | G05F 1/66 |
| | | | | 700/287 |
| 2017/0351226 A1* | 12/2017 | Bliss | .................. | G05B 19/4063 |

* cited by examiner

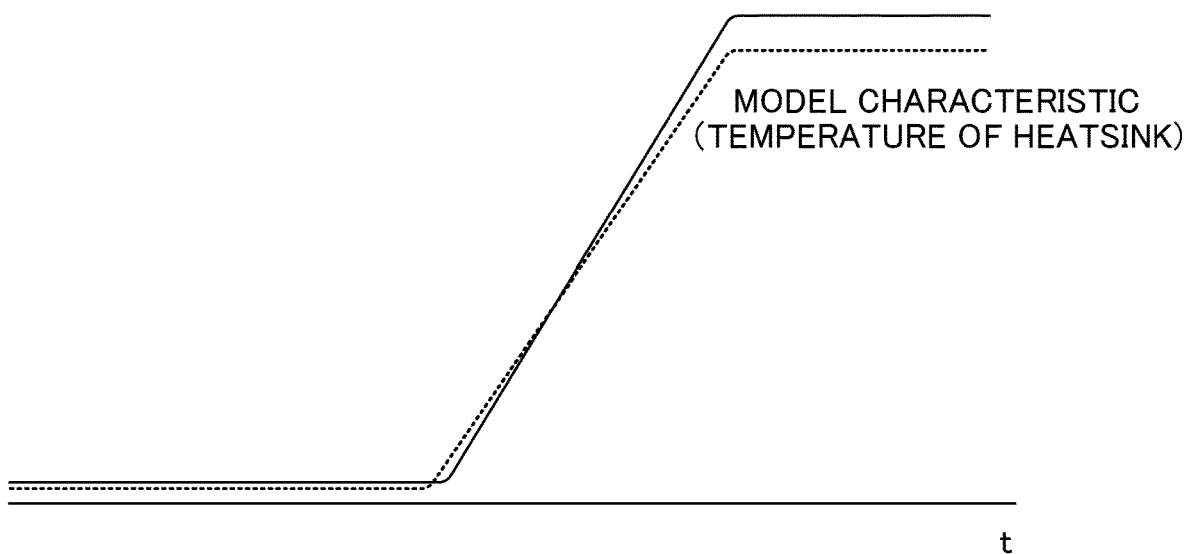

CONTROL DEVICE AND DETERMINATION DEVICE

This application is based on and claims the benefit of priority from Japanese Patent Application No. 2019-126699, filed on 8 Jul. 2019, the content of which is incorporated herein by reference.

BACKGROUND OF THE INVENTION

Field of the Invention

The present invention relates to a control device and a determination device.

Related Art

Hitherto, there are known industrial machines, such as industrial robots and machine tools, which incorporate numerical controllers (NC) for carrying out working processes. In those industrial machines, operations of the industrial machines are controlled by the numerical controllers. The industrial machine and the numerical controller include, for example, sub-devices such as a power printed circuit board, a power element, a heatsink, a smoothing electrolytic capacitor, a housing, and a cooling fan, and a control device for controlling the sub-devices. The sub-devices and the control device are connected through their interfaces.

In general, the sub-device is designed to be replaceable by disconnecting it from the control device. A newly replaced sub-device can be physically connected to the control device if an interface for connection to the control device is in common to the interface of the sub-device before the replacement. In some cases, however, the sub-device may be replaced with a sub-device that can be physically connected to the control device, but that does not satisfy the requirements of the control device and the industrial machine from the viewpoint of capabilities.

As a solution for the above problem, a device is known which can determine that the newly replaced sub-device does not satisfy the requirements of the control device and the industrial machine from the viewpoint of capabilities. In a proposed example of such a device, an abnormality in a coolant system is determined from normal-mode correlation data and actual operation frequency data during the operation of a compressor motor (see, for example, Patent Document 1).

Patent Document 1: Japanese Unexamined Patent Application, Publication No. 2000-297968

SUMMARY OF THE INVENTION

The device disclosed in Patent Document 1 is effective in enabling the abnormality in the compressor motor to be detected. Meanwhile, from the viewpoint of determining suitability of various types of sub-devices, it is desired that the suitability can be determined in accordance with a criterion different for each type of the sub-device.

(1) An embodiment of the present disclosure relates to a determination device including at least one sub-device and a control device that controls the sub-device, and determining suitability of the sub-device, wherein the control device includes a selection unit that selects a type of an actual operation characteristic to be obtained from the sub-device, a model information obtaining unit that obtains, as model information, an operation characteristic estimated to be output from the sub-device that is suitable, the operation characteristic corresponding to the selected type, an operation information obtaining unit that obtains, as actual operation information, operation information regarding the actual operation characteristic of the sub-device, a determination unit that determines the suitability of the sub-device in accordance with a difference between the obtained actual operation information and the obtained model information, and a determination result output unit that outputs a determination result of the determination unit.

(2) Another embodiment of the present disclosure relates to a control device controlling at least one sub-device, the control device including a selection unit that selects a type of an actual operation characteristic to be obtained from the sub-device, a model information obtaining unit that obtains, as model information, an operation characteristic estimated to be output from the sub-device that is suitable, the operation characteristic corresponding to the selected type, an operation information obtaining unit that obtains, as actual operation information, operation information regarding the actual operation characteristic of the sub-device, a determination unit that determines suitability of the sub-device in accordance with a difference between the obtained actual operation information and the obtained model information, and a determination result output unit that outputs a determination result of the determination unit.

The embodiments can provide the control device and the determination device which are able to determine the suitability of the sub-device in accordance with a criterion different for each type of the sub-device.

BRIEF DESCRIPTION OF THE DRAWINGS

FIG. 6 is a conceptual view illustrating an operation signal of a heatsink for which suitability is determined by the determination unit in the determination device according to the embodiment.

DETAILED DESCRIPTION OF THE INVENTION

Figure 1:
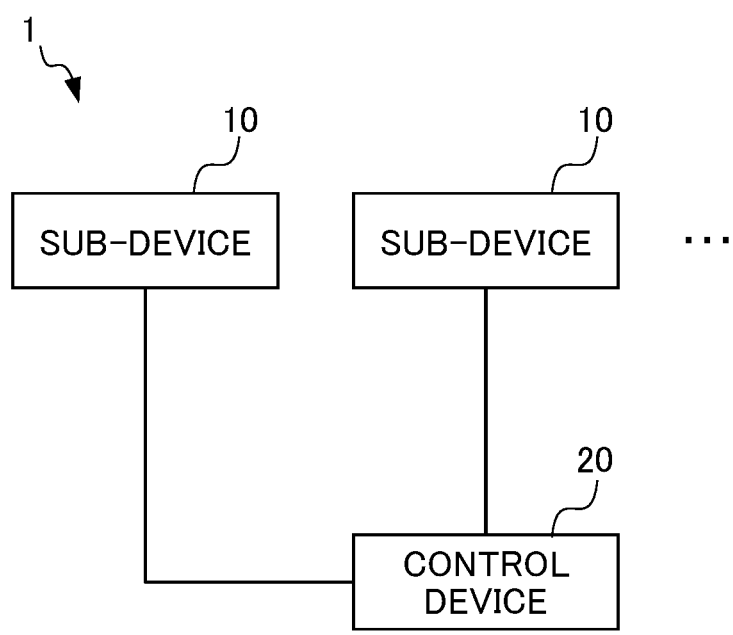
FIG. 1 is a schematic view illustrating a configuration of a determination device according to an embodiment.

A determination device 1 and a control device 20 according an embodiment of the present disclosure will be described below with reference to FIGS. 1 to 6. The determination device 1 is incorporated in, for example, industrial machines such as a motor driver and a numerical controller. The determination device 1 functions as a device for controlling the operations of various components of the industrial machine. The determination device 1 is constituted by combining a plurality of parts. For example, the determination device 1 is constituted by disposing, on a control board, a power printed circuit board, a power element, a heatsink, a smoothing capacitor, a housing (including a cooling fan), and so on in a combined state. The determination device 1 can determine suitability of the parts. As illustrated in FIG. 1, the determination device 1 includes at least one sub-device 10 and the control device 20.

Figure 2:
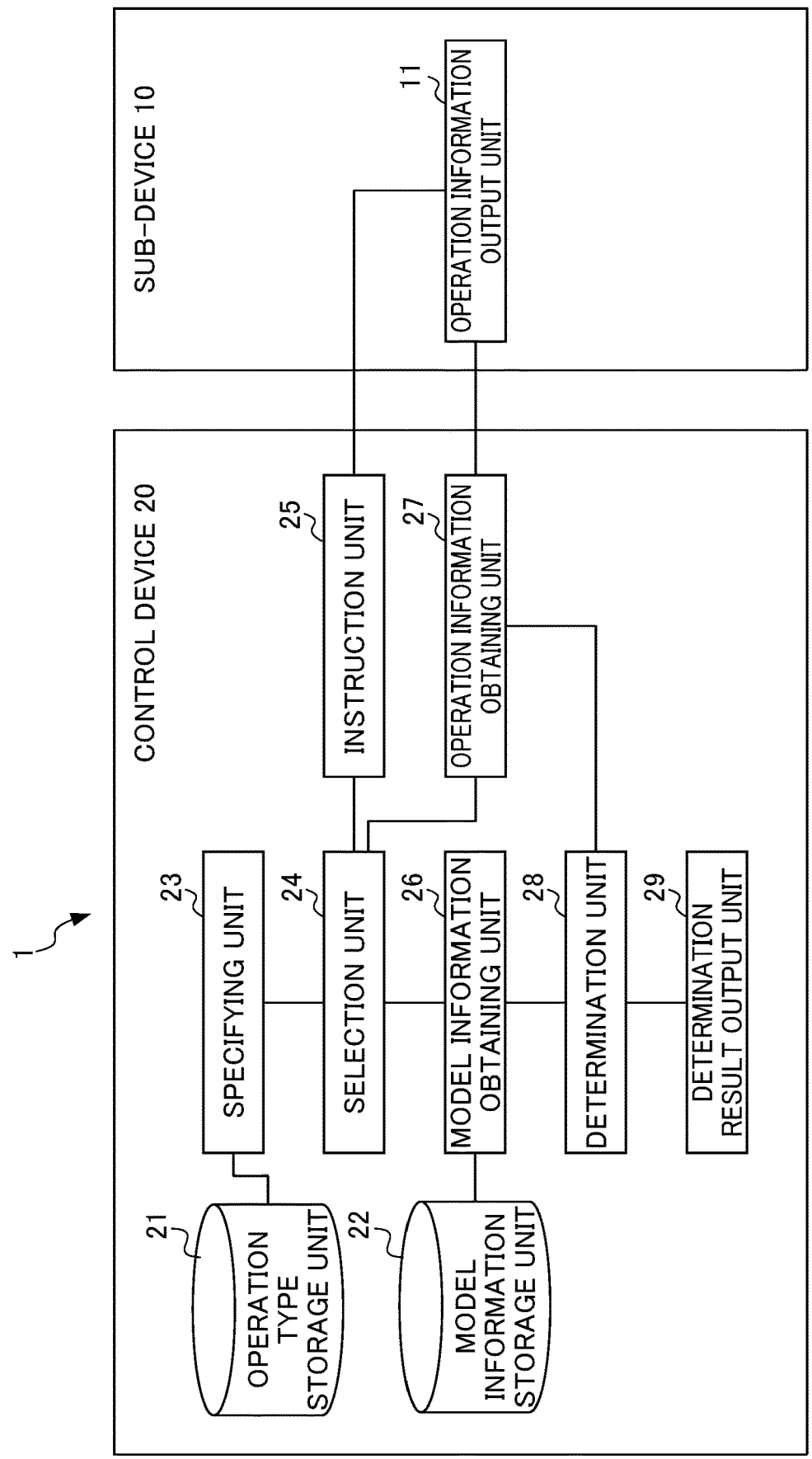
FIG. 2 is a block diagram illustrating a control device of the determination device and a sub-device according to the embodiment.

The sub-device 10 is electrically connected to the control device 20 and is controlled by the control device 20. In this embodiment, the sub-device 10 is the power printed circuit board, the power element, the heatsink, the smoothing capacitor, or the housing (including the cooling fan). As illustrated in FIG. 2, the sub-device 10 includes an operation information output unit 11.

The operation information output unit 11 is constituted with, for example, the operations of various sensors and a CPU. The operation information output unit 11 outputs, as operation information, information regarding the sub-device 10. For example, the operation information output unit 11 outputs, as the operation information, preset numerical values and numerical values obtained from the various sensors. More specifically, the operation information output unit 11 outputs different numerical values depending on each type of the sub-device 10. The operation information output for each type of the sub-device 10 will be described below.

[Power Printed Circuit Board]

When the sub-device 10 is the power printed circuit board, the operation information output unit 11 outputs the operation information to the control device 20 upon receiving a determination signal that is usually not used (for example, an instruction signal instructing application of a voltage value that is usually not used in the operation, or instructing output of a predetermined signal as the operation information). For example, the operation information output unit 11 outputs, as the operation information, a predetermined numerical value that is set in pattern.

[Power Element]

When the sub-device 10 is the power element disposed on the power printed circuit board, the operation information output unit 11 disposed on the power printed circuit board is used as the operation information output unit 11 for the power element. The operation information output unit 11 outputs, as the operation information, a gate signal or a temperature characteristic. For example, the operation information output unit 11 outputs, as the operation information, a gate rising/falling operation (voltage change over time). In another example, the operation information output unit 11 outputs, as the operation information, change in temperature of an IPM (Intelligent Power Module) element.

[Heatsink]

When the sub-device 10 is the heatsink disposed on the power printed circuit board, the operation information output unit 11 disposed on the power printed circuit board is used as the operation information output unit 11 for the heatsink. For example, the operation information output unit 11 outputs, as the operation information, a temperature of the heatsink.

[Smoothing Capacitor]

When the sub-device 10 is the smoothing capacitor disposed on the power printed circuit board, the operation information output unit 11 disposed for the power printed circuit board is used as the operation information output unit 11 for the smoothing capacitor. The operation information output unit 11 outputs, as the operation information, a charging time (or a ripple amount) at the startup.

[Housing]

When the sub-device 10 is the housing of the industrial machine, the operation information output unit 11 outputs, as the operation information, a resistance value or an impedance of a conductive material disposed inside the housing.

[Cooling Fan]

Figure 3:
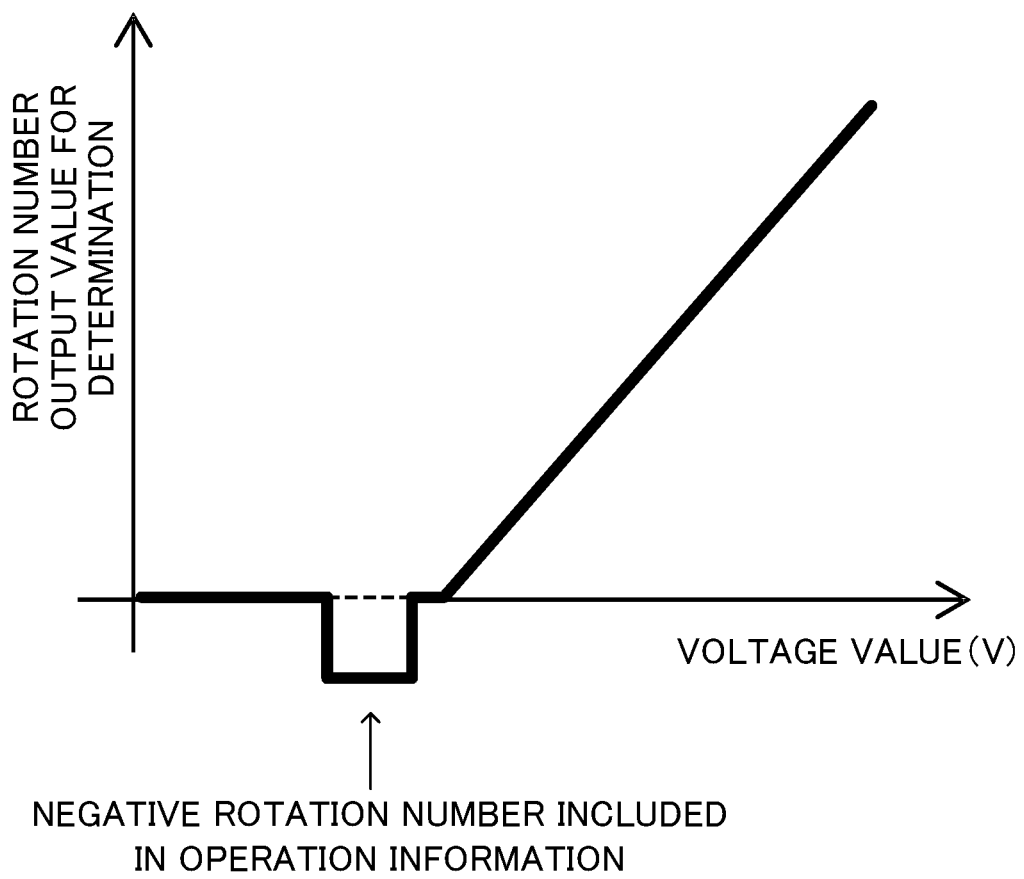
FIG. 3 is a conceptual view illustrating operation information that is obtained from a cooling fan by the determination device according to the embodiment.
Figure 4:
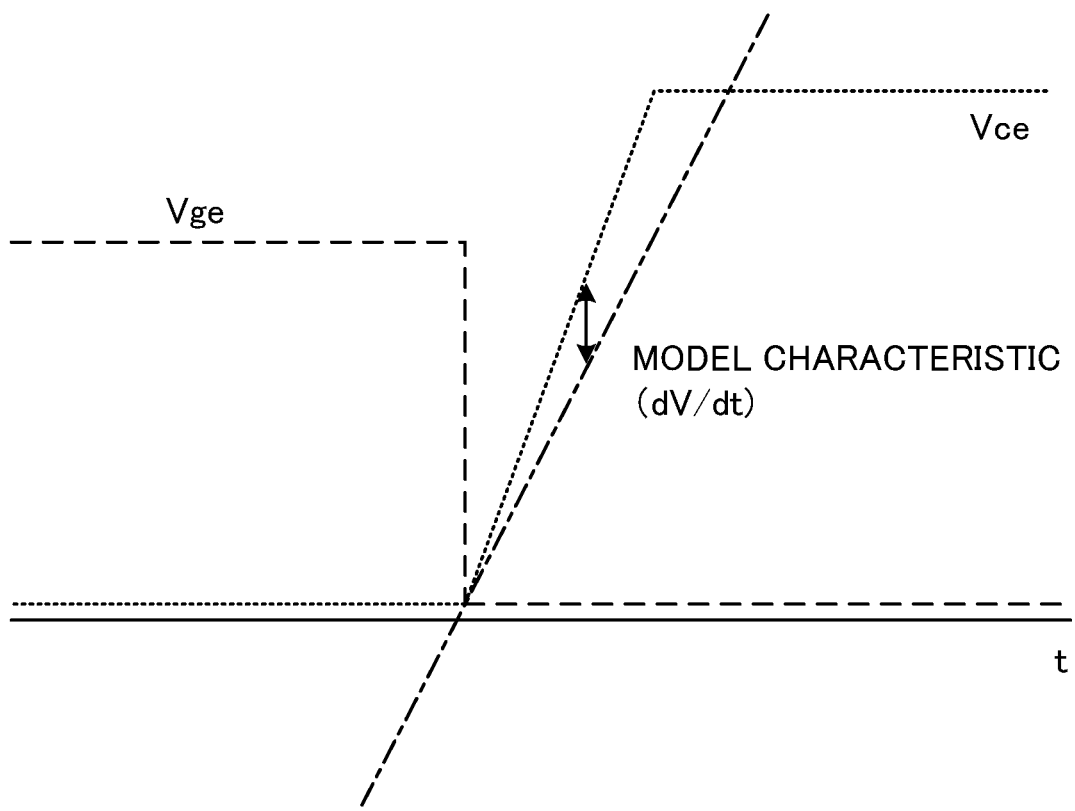
FIG. 4 is a conceptual view illustrating a model signal and an operation signal of a power element for which suitability is determined by a determination unit in the determination device according to the embodiment.

When the sub-device 10 is the cooling fan attached to the housing, the operation information output unit 11 outputs the operation information to the control device 20 upon receiving a determination signal that is usually not used (for example, an instruction signal instructing application of a voltage value that is usually not used in the operation, or instructing output of a predetermined signal as the operation information). For example, the operation information output unit 11 outputs the operation information to the control device 20 upon receiving, as the determination signal that is not usually not used, the instruction signal that instructs a fan motor to be rotated at a predetermined rotation number when a voltage value is applied at a level at which the fan motor is not rotated. In other words, the operation information output unit 11 outputs, as the operation information, a rotation number different from a rotation number that is estimated for the applied voltage value. As illustrated in FIG. 3, for example, the operation information output unit 11 outputs, as the operation information, a negative rotation number instead of an actual rotation number (namely, zero) in response to application of voltage value at which the fan motor (not shown) is not rotated.

The control device 20 can determine whether the sub-device 10 is suitable for use in combination with the control device 20. The control device 20 is connected to the at least one sub-device 10. The control device 20 controls the operation of the sub-device 10 connected to the control device 20. As illustrated in FIG. 2, the control device 20 includes an operation type storage unit 21, a model information storage unit 22, a specifying unit 23, a selection unit 24, an instruction unit 25, a model information obtaining unit 26, an operation information obtaining unit 27, a determination unit 28, and a determination result output unit 29.

The operation type storage unit 21 is, for example, an auxiliary storage device such as a hard disk. The operation type storage unit 21 stores the type of the operation information that can be obtained from the sub-device 10.

The model information storage unit 22 is, for example, an auxiliary storage device such as a hard disk. The model information storage unit 22 stores model information that represents a model for an operation characteristic of the sub-device 10 that is suitable for the combined use. In other words, the model information storage unit 22 stores, as the model information, the operation characteristic that is estimated to be output from the suitable sub-device 10 and that corresponds to the selected type.

The specifying unit 23 is realized with, for example, the operation of the CPU. The specifying unit 23 specifies the type of sub-device 10. For example, in accordance with a selection input entered by a keyboard, a mouse, or the like, the specifying unit 23 specifies the sub-device 10 from which the operation information is to be obtained.

The selection unit 24 is realized with, for example, the operation of the CPU. The selection unit 24 selects the type of the actual operation information to be obtained from the sub-device 10. For example, in accordance with both the type of the operation information stored in operation type storage unit 21 and the type of the sub-device 10 specified by specifying unit 23, the selection unit 24 selects the type of the actual operation information to be obtained from the sub-device 10.

The instruction unit 25 is realized with, for example, the operation of the CPU. The instruction unit 25 instructs the sub-device 10 to output the operation information. For example, the instruction unit 25 instructs the operation information output unit 11 to output the operation information.

The model information obtaining unit 26 is realized with, for example, the operation of the CPU. For example, the model information obtaining unit 26 obtains the model information from the model information storage unit 22 in accordance with the type of the operation information, which has been selected by selection unit 24.

The operation information obtaining unit 27 is realized with, for example, the operation of the CPU. The operation information obtaining unit 27 obtains the operation information (actual operation information) regarding the actual operation characteristic of the sub-device 10. In this embodiment, the operation information obtaining unit 27 obtains the actual operation information output from the operation information output unit 11.

The determination unit 28 is realized with, for example, the operation of the CPU. The determination unit 28 determines suitability of the sub-device 10 in accordance with a difference between the obtained actual operation information and the obtained model information.

The determination result output unit 29 is, for example, a display device or a voice reproduction device. The determination result output unit 29 outputs a determination result determined by determination unit 28.

The operations of the control device 20 and the determination device 1 will be described below. First, the specifying unit 23 specifies the type of the sub-device 10. In accordance with the type of the sub-device 10 specified by specifying unit 23, the selection unit 24 selects the type of the actual operation characteristic to be obtained. The instruction unit 25 instructs the operation information output unit 11 to output the selected operation characteristic. Furthermore, the model information obtaining unit 26 obtains the model information corresponding to the selected type of the operation characteristic. The operation information obtaining unit 27 obtains the operation information output from the operation information output unit 11.

The determination unit 28 compares the obtained operation information with the obtained model information, and determines whether the sub-device 10 is suitable for the control device 20, as described below. The determination result output unit 29 outputs a determination result.

Determination procedures made by the determination unit 28 for each type of the sub-device 10 are described.

[Power Printed Circuit Board]

When the sub-device 10 is the power printed circuit board, the determination unit 28 determines whether the numerical value set in pattern, which is output from the operation information output unit 11, matches with a numerical value included in the model information. If a determination result is "match", the determination unit 28 determines that the sub-device 10 is suitable for use in combination with the control device 20. On the other hand, if the output numerical values are different from each other, or if any numerical value is not output, the determination unit 28 determines that the sub-device 10 is not suitable for use in combination with the control device 20.

[Power Element]

Figure 5:
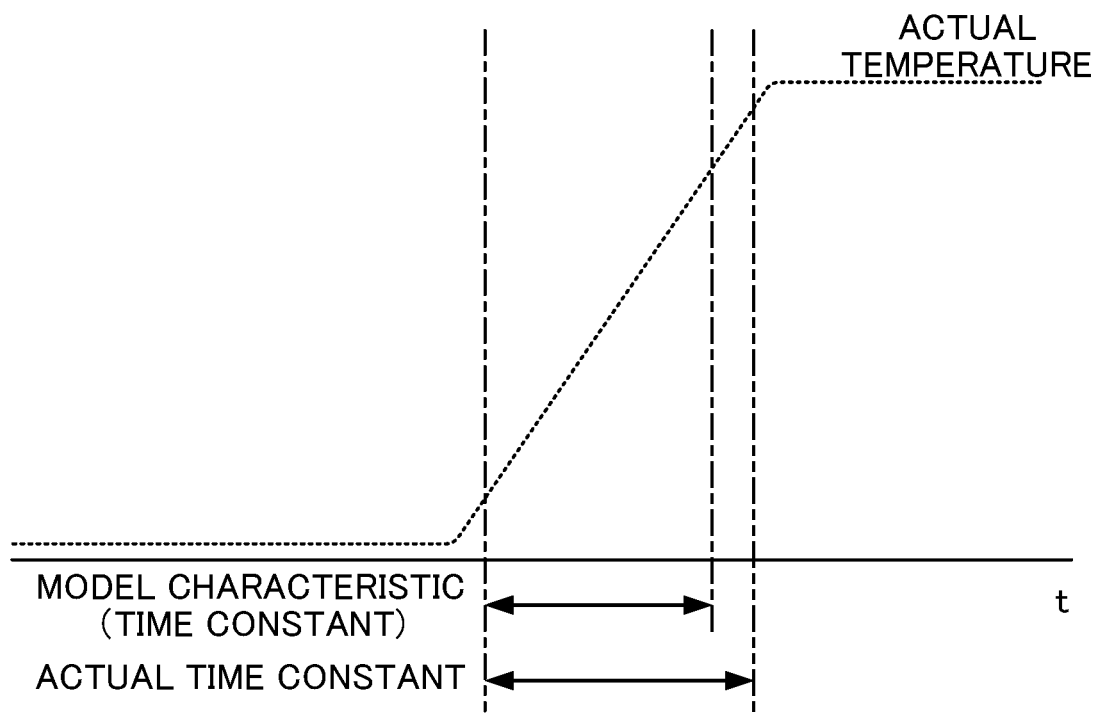
FIG. 5 is a conceptual view illustrating a model signal and an operation signal of the power element for which suitability is determined by the determination unit in the determination device according to the embodiment.

When the sub-device 10 is the power element disposed on the power printed circuit board, the determination unit 28 determines, based on the operation information from the operation information output unit 11, whether the gate rising taking operation of the power element matches with a characteristic included in the model information (namely, a model characteristic representing a model of the rising/falling characteristic). For example, the determination unit 28 determines whether a difference between the rising characteristic of a collector-emitter voltage (Vce) at falling of a gate-emitter voltage (Vge) and the model characteristic is within a predetermined range. If the difference between the rising characteristic of Vce (namely, voltage change over time) and the model characteristic is within the predetermined range as denoted by a dotted line in FIG. 4, the determination unit 28 determines that the sub-device 10 is suitable for use in combination with the control device 20. In another example, if a difference between the time constant of a gate temperature and the model characteristic of temperature is within a predetermined range as illustrated in FIG. 5, the determination unit 28 determines that the sub-device 10 is suitable for use in combination with the control device 20. On the other hand, if a difference between the time constant of a gate temperature and the model characteristic of temperature is not within a predetermined range, the determination unit 28 determines that the sub-device 10 is not suitable for use in combination with the control device 20.

[Heatsink]

When the sub-device 10 is the heatsink disposed on the power printed circuit board, the determination unit 28 determines that the sub-device 10 is not suitable for use in combination with the control device 20, if a rising temperature value of the heatsink over time deviates from a model of the temperature characteristic by a predetermined temperature or more as illustrated, by way of example, in FIG. 6. On the other hand, if the rising temperature value of the heatsink over time does not deviate from the model of the temperature characteristic by the predetermined temperature or more, the determination unit 28 determines that the sub-device 10 is suitable for use in combination with the control device 20.

[Smooth in Capacitor]

When the sub-device 10 is the smoothing capacitor disposed on the power printed circuit board, the determination unit 28 determines that the sub-device 10 is suitable for use in combination with the control device 20, if a difference between the charging time (or the ripple amount) at the startup and the model information is within a predetermined range. On the other hand, if the difference between the charging time (or the ripple amount) at the startup and the model information is not within the predetermined range, the determination unit 28 determines that the sub-device 10 is not suitable for use in combination with the control device 20.

[Housing]

When the sub-device 10 is the housing of the industrial machine, the determination unit 28 determines that the sub-device 10 is suitable for use in combination with the control device 20, if a difference between the resistance value or the impedance of the conductive material disposed inside the housing and the model information is within a predetermined range. On the other hand, if the difference between the resistance value or the impedance of the conductive material disposed inside the housing and the model information is not within the predetermined range, the determination unit 28 determines that the sub-device 10 is not suitable for use in combination with the control device 20.

[Cooling Fan]

When the sub-device 10 is the cooling fan attached to the housing, the determination unit 28 determines that the sub-device 10 is suitable for use in combination with the control device 20, if a rotation number different from the rotation number estimated in accordance with the model information for the applied voltage value is received. On the other hand, if a rotation number different from the rotation number estimated in accordance with the model information for the applied voltage value is not received, the determination unit 28 determines that the sub-device 10 is not suitable for use in combination with the control device 20.

The control device 20 and the determination device 1 according to the embodiment, described above, can provide the following advantageous effects.

(1) In the determination device 1 including the at least one sub-device 10 and the control device 20 that controls the sub-device 10, and determining the suitability of the sub-device 10, the control device 20 includes the selection unit 24 that selects the type of the actual operation characteristic to be obtained from the sub-device 10, the model information obtaining unit 26 that obtains, as the model information, the operation characteristic estimated to be output from the sub-device 10 that is suitable, the operation characteristic corresponding to the selected type, the operation information obtaining unit 27 that obtains the operation information regarding the actual operation characteristic of the sub-device 10, the determination unit 28 that determines the suitability of the sub-device 10 in accordance with the difference between the obtained operation information and the obtained model information, and the determination result output unit 29 that outputs a determination result of the determination unit 28. Thus the suitability of the sub-device 10 for the control device 20 is determined in accordance with the selected operation information of the sub-device 10. As a result, the suitability can be determined in accordance with a criterion different for each type of the sub-device 10, and general versatility of the control device 20 and the determination device 1 can be increased.

(2) The control device 20 further includes the instruction unit 25 that instructs the sub-device 10 to output the operation information, and the sub-device 10 includes the operation information output unit 11 that outputs the operation information in response to the instruction from the instruction unit 25. Therefore, the control device 20 and the determination device 1 can be realized which operate in a manner of not only passively obtaining the operation information, but also actively obtaining the operation information. As a result, flexibility in the determination made by the control device 20 and the determination device 1 can be improved.

While the preferred embodiment of the control device and the determination device according to the present disclosure have been described above, the present disclosure is not limited to the above-described embodiment and can be modified as appropriate.

For example, in the embodiment, apparatuses in which the control device 20 and the determination device 1 are incorporated are not limited to the industrial machines. The control device 20 and the determination device 1 can be applied to any types of apparatuses insofar as the apparatus is constituted by, for example, combining a plurality of parts.

In the embodiment, the sub-device is not limited to the above-mentioned types of devices and components. The sub-device may be any other type of devices and components insofar as they can be connected to the control device through interfaces.

While, in the embodiment, the operation information output unit 11 for each of the power element, the heatsink, the smoothing capacitor, for example, is disposed on the power printed circuit board, the present disclosure is not limited to such a case. The operation information output unit 11 may be directly disposed on each of the devices and the components. The operation information output unit 11 may be constituted to output, for example, a feedback signal such as an output current.

EXPLANATION OF REFERENCE NUMERALS 1 determination device
10 sub-device
11 operation information output unit
20 control device
23 specifying unit
24 selection unit
26 model information obtaining unit
27 operation information obtaining unit
28 determination unit
29 determination result output unit

What is claimed is:

1. A determination device including at least one sub-device that is a power printed circuit board, a power element, a heatsink, a smoothing capacitor, a housing, or a cooling fan and a control device that controls the sub-device, and determining suitability of the sub-device,
wherein the control device comprises a first processor and an output device including a display device or a voice reproduction device, the first processor being configured to:
specify a sub-device type of the sub-device;
select a parameter type of an actual value to be obtained from the sub-device based on the specified sub-device type;
obtain, as model information, a predetermined value estimated to be output from the sub-device that is suitable, the predetermined value corresponding to the selected parameter type;
obtain the actual value of the sub-device; and
determine whether the sub-device satisfies a predetermined requirement in accordance with a difference between the obtained actual value and the obtained model information, wherein
the output device informs an operator that the sub-device is not suitable for the control device to prompt the operator to disconnect the sub-device from the control device in response to a determination result of suitability of the sub-device.

2. The determination device according to claim 1, wherein the first processor instructs the sub-device to output the actual value, and
the sub-device includes a second processor that outputs the actual value in response to an instruction from the first processor.

3. The determination device according to claim 1, wherein the first processor specifies a type of the sub-device, and
the first processor selects the parameter type in accordance with the specified type of the sub-device.

4. A control device controlling at least one sub-device that is a power printed circuit board, a power element, a heatsink, a smoothing capacitor, a housing, or a cooling fan, the control device comprising a first processor and an output device including a display device or a voice reproduction device, the first processor being configured to:
specify a sub-device type of the sub-device;
select a parameter type of an actual value to be obtained from the sub-device based on the specified sub-device type;

obtain, as model information, a predetermined value estimated to be output from the sub-device that is suitable, the predetermined value corresponding to the selected parameter type;

obtain the actual value of the sub-device; and determine whether the sub-device satisfies a predetermined requirement in accordance with a difference between the obtained actual value and the obtained model information, wherein the output device informs an operator that the sub-device is not suitable for the control device to prompt the operator to disconnect the sub-device from the control device in response to a determination result of suitability of the sub-device.

* * * * *